(No Model.) 2 Sheets—Sheet 1.

F. MÜLLER.
LATHE CHUCK.

No. 385,474. Patented July 3, 1888.

Witnesses,

Inventor,
F. Müller,
by Henry Calver,
Attorney.

(No Model.) 2 Sheets—Sheet 2.
F. MÜLLER.
LATHE CHUCK.
No. 385,474. Patented July 3, 1888.
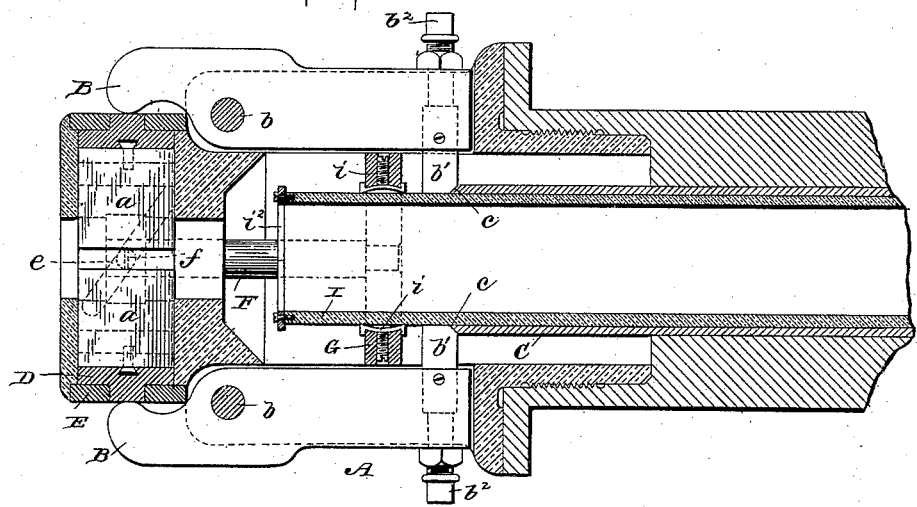
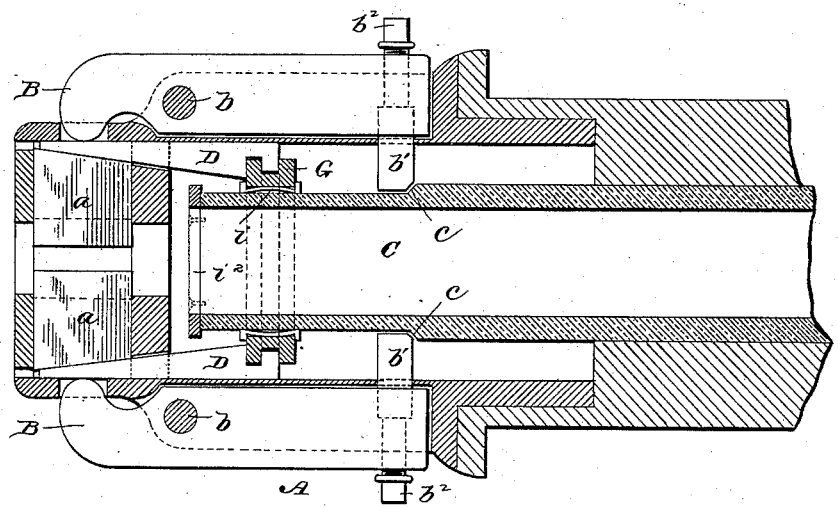

UNITED STATES PATENT OFFICE.

FRIEDERICH MÜLLER, OF ELIZABETH, NEW JERSEY.

LATHE-CHUCK.

SPECIFICATION forming part of Letters Patent No. 385,474, dated July 3, 1888.

Application filed September 26, 1887. Serial No. 250,754. (No model.)

*To all whom it may concern:*

Be it known that I, FRIEDERICH MÜLLER, a citizen of the United States, residing at Elizabeth, in the county of Union and State of New Jersey, have invented certain new and useful Improvements in Lathe-Chucks, of which the following is a specification, reference being had therein to the accompanying drawings.

My invention relates to that class of lathe-chucks in which the holding-jaws are closed by levers which are operated by a sliding bar or tube having an annular inclined shoulder which abuts against studs on the jaw-operating levers to close the latter, the said studs being adjustable to vary the throw of the levers within a limited extent to cause the jaws to grasp articles varying slightly in diameter. In the use of these chucks, however, a careful adjustment of the studs on the jaw-operating levers is required to enable the jaws to tightly hold a rod or other piece of metal of a given size, and a new adjustment of the said studs is required whenever an article of a different size is to be held in the chuck.

The object of my invention is to obviate this inconvenience by rendering the chucks self-adjusting, so that within certain reasonable limits objects of varying sizes may be tightly grasped by the chuck-jaws without a readjustment of the studs on the jaw-operating levers. To this end I provide the chuck with wedges, which are interposed between the jaws and their operating-levers, said wedges having a frictional connection with a sliding bar or tube, which may or may not be the same tube which has the annular inclined shoulder to engage the studs on the jaw-operating levers.

Figure 1:
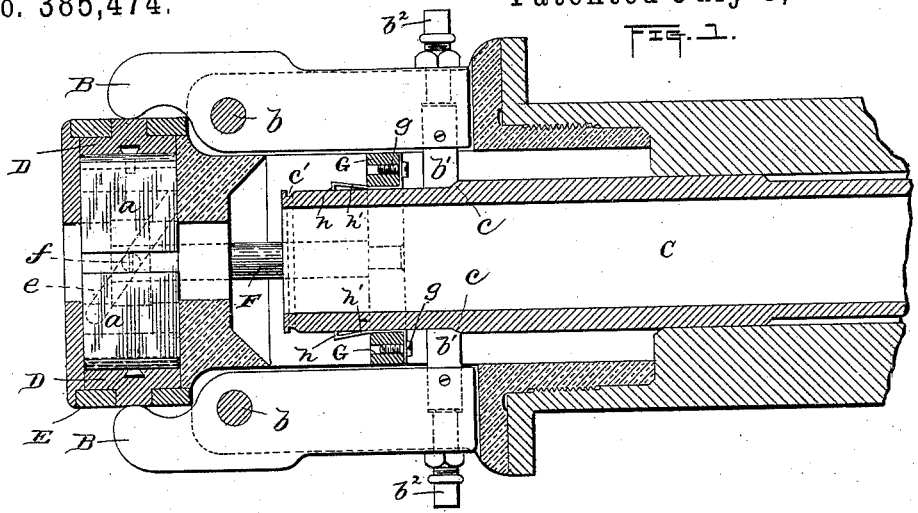
Figure 2:
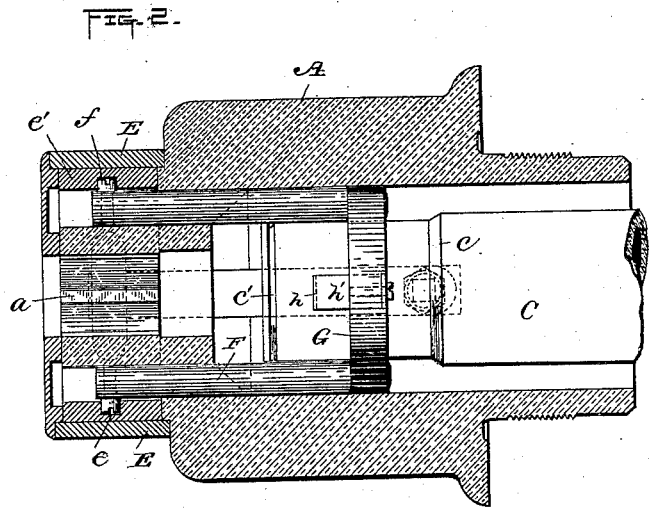
Figure 3:
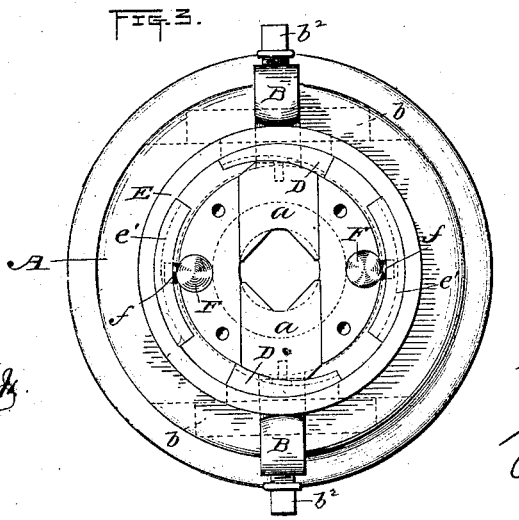

In the drawings, Figures 1 and 2 are longitudinal sectional views, taken at right angles to each other, of a chuck embodying my invention. Fig. 3 is a front end view of the same with the end cap removed. Figs. 4 and 5 are sectional views illustrating modifications of my invention.

A denotes the tubular chuck-head, provided with the radially-movable sliding jaws $a$.

B are the jaw-operating levers, pivoted on pins $b$ in the head A, the said levers being provided at their ends with studs $b'$ and with adjusting-screws $b^2$ for the said studs.

C is a sliding tube having an annular inclined shoulder, $c$, to engage the studs $b'$ to actuate the jaw-operating levers. Instead of having the outer ends of the levers B in direct contact with the jaws $a$, as heretofore, I provide wedges D, which are interposed between the said jaws and levers. The said wedges are preferably of segmental form, and are carried by a ring, E, capable of being rotated, the said ring being provided with inclined slots $e$, which are engaged by studs or screws $f$, carried by sliding rods F, attached at their ends to a ring, G, having a frictional connection with the sliding tube C by means of the small hooks $h$ at the ends of the spring $h'$, attached by screws $g$ to the ring G, the said hooks engaging the annular groove $c'$ of the said tube when the ring G and the parts connected therewith are to be moved to operate the rotary ring E. The inclined slots $e$ are herein shown as being formed in cam-pieces $e'$, attached to and movable with the ring E. This is merely for convenience of construction, and it is obvious that the said slots might be formed directly in the ring E.

In Fig. 1 the parts are represented in the position which they will occupy when the jaws $a$ are to grasp a rod or bar inserted in the chuck. When it is desired to release the said jaws, the tube C is drawn back, removing the shoulder $c$ thereon from the studs $b'$ of the levers B, the ring G remaining stationary as the tube C slides through it until the hooks $h$ of the springs $h'$ fall into the groove $c'$ of the said tube, when the square shoulder at the outer side of the said groove, acting against the outer ends of the said hooks, will cause the ring G and the sliding rods F to move backward with the tube C, the studs $f$ on the said rods working in the inclined slots $e$ of the ring E, giving a backward rotary movement to the said ring, and thereby releasing the wedges D from the jaws $a$ to loosen the latter. When the said jaws $a$ are to be closed, the tube C is moved forward, carrying with it the ring G and rods F, the studs on the latter giving a forward rotary movement to the ring E and the wedges D carried thereby until the jaws are closed on the article in the chuck and the wedges are forced tightly between them and the outer ends of the levers B. When this has been accomplished, the forward movement of the ring G will cease and the inclined shoulder at the inner side of the annular groove $c'$ will permit the hooks $h$ of the springs $h'$ to ride up out of the said groove, and the tube C will then pass freely through the said ring G until the shoulder $c$ on the said tube strikes the studs $b'$ on the levers B, (see Fig. 1,) and thus positively locks the jaws $a$.

In the modification shown in Fig. 4 the frictional connection between the ring G and the sliding tube I, by which said ring is operated, instead of being formed by the hooked springs shown in Fig. 1, is effected by the friction-pieces or collar $i$, which may be adjusted by the screws $i'$ to grasp the tube I with any desired degree of tightness. The ring or flange $i^2$ at the outer end of the tube I serves by contact with the friction-pieces or collar $i$ of the ring G to force the said ring inward with its tube when the clamping-jaws $a$ are to be released. The tube I, by which the ring G is carried, is also shown as being separate from the tube C, having the shoulder $c$ for engagement with the studs $b'$ of the levers B.

In the modification shown in Fig. 5 the wedges D, which are interposed between the outer ends of the levers B and the jaws $a$, are shown as being arranged lengthwise of the chuck and connected directly to the ring G, the frictional connection between the said ring and the sliding tube by which it is carried being the same as is shown in Fig. 4.

It will thus be apparent that the details of my invention may be varied considerably without departing from the essential features thereof. Two levers, B, and two jaws, $a$, are shown in the drawings, but three or more of each of these parts may be used, if desired.

Having thus described my invention, I claim and desire to secure by Letters Patent—

1. In a chuck, the combination, with the jaws $a$ and their operating-levers B, of the wedges D, interposed between the outer ends of the said levers and the said jaws, and a sliding bar or tube having a frictional connection with the said wedges, substantially as set forth.

2. The combination, with the chuck-head having the jaws $a$, of the levers B, having the studs $b'$, the sliding tube C, having the inclined shoulder $c$, the wedges D, the ring E, carrying the said wedges and having the inclined slots $e$, the sliding rods F, having studs working in said slots, and the ring G, frictionally connected with the said tube, substantially as set forth.

3. The combination, with the chuck-head having the jaws $a$, of the levers B, having the studs $b'$, the sliding tube C, having the inclined shoulder $c$ and the annular groove $c'$, the wedges D, the ring E, carrying the said wedges and provided with the inclined slots $e$, the sliding rods F, having studs working in said slots, the ring G, and the hooked springs $h'$, substantially as set forth.

In testimony whereof I affix my signature in presence of two witnesses.

FRIEDERICH MÜLLER.

Witnesses:
PHILIP DIEHL,
L. L. BURRETT.